US008238681B2

(12) United States Patent
Samurov et al.

(10) Patent No.: US 8,238,681 B2
(45) Date of Patent: Aug. 7, 2012

(54) ADAPTIVE CONFIGURATION OF WINDOWS-OF-INTEREST FOR ACCURATE AND ROBUST FOCUSING IN MULTISPOT AUTOFOCUS CAMERAS

(75) Inventors: Vitali Samurov, Tampere (FI); Evgeny Krestyannikov, Tampere (FI)

(73) Assignee: Nokia Corporation, Espoo (FI)

( * ) Notice: Subject to any disclaimer, the term of this patent is extended or adjusted under 35 U.S.C. 154(b) by 922 days.

(21) Appl. No.: 12/315,060

(22) Filed: Nov. 25, 2008

(65) Prior Publication Data

US 2010/0129002 A1 May 27, 2010

(51) Int. Cl.
G06K 9/40 (2006.01)
G03B 13/00 (2006.01)
G03B 3/00 (2006.01)

(52) U.S. Cl. .......................... 382/255; 348/352; 396/127

(58) Field of Classification Search .................. 382/255; 348/352; 396/127
See application file for complete search history.

(56) References Cited

U.S. PATENT DOCUMENTS

| 5,212,557 A * | 5/1993 | Ueda ............................ 348/347 |
| 5,477,271 A * | 12/1995 | Park ............................ 348/356 |
| 7,428,375 B2 | 9/2008 | Yost et al. ....................... 396/52 |
| 7,486,330 B2 * | 2/2009 | Sawachi ....................... 348/345 |
| 7,705,908 B2 * | 4/2010 | Fredlund et al. .............. 348/349 |
| 7,734,166 B2 * | 6/2010 | Hamamura et al. .......... 396/104 |
| 7,995,131 B2 * | 8/2011 | Yeh ............................. 348/345 |
| 2006/0066744 A1 * | 3/2006 | Stavely et al. ................. 348/352 |
| 2006/0153471 A1 * | 7/2006 | Lim et al. ...................... 382/255 |
| 2006/0164934 A1 * | 7/2006 | Huang ....................... 369/44.11 |
| 2007/0009249 A1 * | 1/2007 | Kim ............................. 396/121 |
| 2007/0212049 A1 * | 9/2007 | Guroglu et al. ............... 396/127 |
| 2008/0031327 A1 * | 2/2008 | Wang et al. ............... 375/240.12 |
| 2008/0166117 A1 | 7/2008 | Li et al. ......................... 396/121 |
| 2008/0316352 A1 * | 12/2008 | Cheng et al. .................. 348/345 |

* cited by examiner

Primary Examiner — Wenpeng Chen
(74) Attorney, Agent, or Firm — Harrington & Smith

(57) ABSTRACT

In accordance with the exemplary embodiments of the invention there is at least a method, executable computer program, and apparatus to provide operations including logically separating into a plurality of parts at least one sub-window of interest of a plurality of sub-windows of interest arranged in a grid formation in an autofocus window of interest, assigning a focus value mask to each of the plurality of parts of the at least one sub-window, and executing an autofocus algorithm using the assigned focus value masks.

26 Claims, 3 Drawing Sheets

ADAPTIVE CONFIGURATION OF WINDOWS-OF-INTEREST FOR ACCURATE AND ROBUST FOCUSING IN MULTISPOT AUTOFOCUS CAMERAS

TECHNICAL FIELD

The teachings in accordance with the exemplary embodiments of this invention relate generally to an autofocus feature in a digital imaging camera and, more specifically, relate to a novel adaptive configuration scheme for operations using windows of interest in a multispot autofocus.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years digital imaging cameras have been commonly used as imaging devices for photographing subjects. A conventional digital camera (such as a digital still camera or digital video camera) generally acquires an image by using an imaging element or the like, and records the image as digital image data in an internal memory or integrated circuit card provided inside the camera. In an imaging device such as the above-described digital imaging camera, a lens is provided for the purpose of focusing a subject image onto the imaging element with the subject is being photographed. By controlling a focusing of the lens, a focusing distance can be aligned with the subject being photographed.

To address a wide spectrum of customer needs, mobile phones are rapidly converging into multi-purpose devices that incorporate multiple different products including digital imaging cameras. Digital imaging cameras nowadays are often seen as an integrated part of any mobile phone. However, the digital imaging features of these camera phones are mostly less functional and reliable than their counterparts, stand-alone digital imaging cameras. To address this gap of functionality and reliability, camera phones manufacturers strive to offer more sophisticated features and technological know-how to ensure high quality photo images with the digital imaging features of their phones.

One important feature to be included in a camera system is autofocus (AF). The AF feature is designed to allow a user of the camera system to obtain a correct focus of a subject of particular interest without manually adjusting the lens focal length.

All automatic focusing algorithms can be divided into two broad categories: active and passive. While active AF can be achieved using the external sensors (e.g. infrared), many consumer-level digital and cell phone cameras utilize passive AF. Passive AF is used to determine the correct focus of an image by using contrast or image sharpness measurements of the image. It can be understood that these measurements for AF may be performed for one or several respective areas or windows of the image.

Generally, a passive AF is performed utilizing an AF algorithm to calculate a measurement of image sharpness or focus corresponding to the image in order to determine a best in-focus setting. The in-focus setting is usually found by choosing a respective lens position where the image sharpness or focus is maximal. Then the determined in-focus setting can be used for an AF of the image.

It is noted that the operation of the AF techniques of the prior art digital cameras may deviate in their details somewhat from the description given above. However, it can be realized that prior art AF systems, such as the ones mentioned above, may be subject to certain limitations. These limitations can become apparent for certain cases, such as for cases where a resulting calculation of an image sharpness or focus does not correspond to a particular setting of the image, or where a condition of the subject or the camera interferes with the abilities of the AF system. Some of these limitations are described below in non-limiting terms.

According to the numerous surveys, a highly frequent use of cameras in mobile devices is portrait imaging. Portrait imaging may be seen as the photographing of a single person or a group of people at a shorter distance, such as 1.5-3 meters, set to a more distant background which may constitute contrasting scenery. In a portrait image the single person or group of people of the image may be smaller parts of the image in comparison to the scenery. As such, a problem can exist where an AF technique, such as the passive AF technique as described above, may not choose the best in-focus position desired for the photograph.

In addition, it is common that while a photograph is being taken the image lighting may be low which may tend, among other things, to render parts of the image less distinguishable from other parts of the image, thus effecting an AF. Further, it is a common occurrence that during an AF the camera may inadvertently move during a photograph due to a shaking of a hand holding the camera and/or a movement of the subject being photographed. These common occurrences can subsequently lead to inaccuracies in an AF process.

Exemplary embodiments of the invention address potential AF problems, such as the ones mentioned above by example.

SUMMARY

In an exemplary aspect of the invention, there is a method comprising logically separating into a plurality of parts at least one sub-window of interest of a plurality of sub-windows of interest arranged in a grid formation in an autofocus window of interest, assigning a focus value mask to each of the plurality of parts of the at least one sub-window, and executing an autofocus algorithm using the assigned focus value masks.

In another exemplary aspect of the invention, there is a computer readable medium encoded with a computer program executable by a processor to perform actions comprising logically separating into a plurality of parts at least one sub-window of interest of a plurality of sub-windows of interest arranged in a grid formation of an autofocus window of interest, assigning a focus value mask to each of the plurality of parts of the at least one sub-window, and executing an autofocus algorithm using the assigned focus value masks.

In still another exemplary aspect of the invention, there is an apparatus comprising a processor configured to logically separating into a plurality of parts at least one sub-window of interest of a plurality of sub-windows of interest arranged in a grid formation of an autofocus window of interest, the processor configured to assign a focus value mask to each of the plurality of parts of the at least one sub-window, and the processor further configured to execute an autofocus algorithm using the assigned focus value masks.

In yet another exemplary aspect of the invention, there is an apparatus, comprising means for logically separating into a plurality of parts at least one sub-window of interest of a plurality of sub-windows of interest arranged in a grid formation in an autofocus window of interest, means for assigning a focus value mask to each of the plurality of parts of the at least one sub-window, and means for executing an autofocus algorithm using the assigned focus value masks.

In according to the exemplary aspect of the invention above, the means for logically separating, means for assigning, and means for executing comprises a processor.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1:
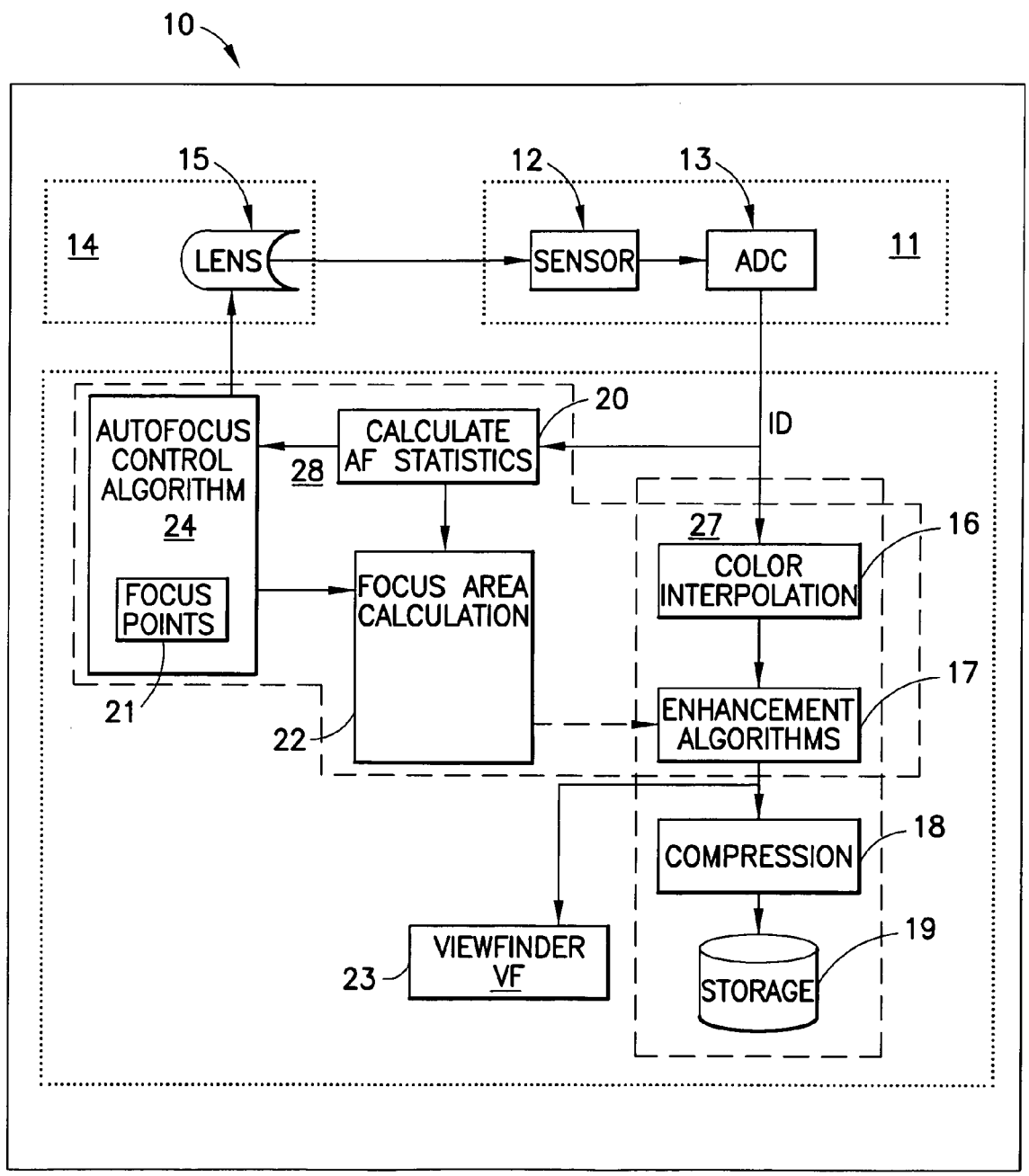
FIG. 1 illustrates a block diagram showing functional modules of a device which may incorporate the exemplary embodiments of the invention.

As an image is viewed, a square or other shape may be presented on a user interface viewing of the image. According to the exemplary embodiments of the invention this square or other shape presented within the image is considered a window of interest (WOI), and this WOI is used for an AF operation. The WOI presented on a phone can take different forms. Some phones may have a large square, while others may have a small square. However, many cameras have a small square in the centre of the image or a matrix of squares, such as can be a 3×3 matrix, a 9×9 matrix, or other matrix size, of which one or a few of the squares are selected as the areas in a focus operation. These segmented squares or other shapes can each be referred to as a sub window of interest or sub-WOI. It is noted that the WOI may be present on a charge coupled device CCD of the camera. Further, a WOI may not be visible on the user interface of a phone.

A passive AF algorithm may be achieved by using a contrast measurement or phase detection system. Contrast measurement may be accomplished by measuring contrast within a sensor field or WOI through a lens. The intensity difference between adjacent pixels of the sensor naturally increases with correct image focus. An optical system can thereby be adjusted until the maximum contrast is detected. In this method, an AF does not involve actual distance measurement at all and is generally slower than phase detection systems, especially when operating under dim light. The contrast measurement method for AF is a common method in video cameras and digital cameras that lack shutters and reflex mirrors. Some cameras use this method when focusing in modes such as a preview mode.

Phase detection for an AF is achieved by dividing incoming light into pairs of images and comparing them. Both film and digital cameras may use passive phase detection or secondary image registration for this process. The phase detection system uses a beam splitter which may be implemented as a small semi-transparent area of a main reflex mirror coupled with a small secondary mirror to direct light to an AF sensor at the bottom of the camera. Two optical prisms capture the light rays coming from the opposite sides of the lens and divert it to the AF sensor, creating a simple rangefinder with a base identical to the lens' diameter. The two images are then analyzed for similar light intensity patterns (e.g. peaks and valleys) and the phase difference is calculated in order to determine if the object is in a front focus or back focus position. This provides the direction of focusing and amount of movement required for a focus ring. Although AF sensors are typically one-dimensional photosensitive strips that are a few pixels high and a few dozen pixels wide, some modern cameras feature area sensors that are more rectangular so as to provide two-dimensional intensity patterns. A phase detection system may include cross-type focus points that have a pair of sensors oriented at 90° to one another and where one sensor typically requires a larger aperture to operate than the other. Some cameras also have a few 'high precision' focus points with an additional set of prisms and sensors which are only active for certain focal ratios.

In one manner, a passive AF algorithm may operate with measurements using a single WOI of an image, for which case the passive AF operation is referred to as a singlespot AF. In another manner, the passive AF algorithm may operate with measurements using multiple WOIs of an image, for which case the passive AF operation is referred to as a multispot AF. Thus, AF measurements may be performed for one or several respective areas of an image.

FIG. 1 shows an electronic device 10 such as a user equipment which may incorporate the exemplary embodiments of the invention.

In FIG. 1 a device 10 can be, for example, a digital camera equipped with a still and/or video imaging capability, a digital video camera, a mobile station equipped with a camera, a camera phone, or some other similar smart communicator (PDA), the components of which are peripheral from the point of view of the invention and so are not described in greater detail in this connection. Embodiments of the invention relate not only to the device 10, but also to at least a focusing module 28, such as may be, for example, disposed in the device 10.

The device 10 according to the invention can include, as modular components, a camera circuit 11, 14 and a digital image-processing chain 27 connected to it and to a focusing circuit 28.

The camera circuit 11, 14 can include an image sensor totality 12, 13, which is as such known, together with movable (or otherwise focal-length adjustable) lenses 15. The imaging target, which is converted by the camera sensor 12 in a known manner to form electrical signals, is converted into a digital form using an analog to digital AD converter 13. In an embodiment the sensor 12 is one or more CCDs.

The focusing circuit 28 is in the device 10 for focusing the camera circuit 11, 14. A solution according to the exemplary embodiments of the invention can be implemented in a circuit such as the focusing circuit 28. Using the focusing circuit 28, at least one of the image objects in an imaging target can be focused to the camera circuit 11, 14, more particularly to the sensor 12, prior to the performance of the imaging that it intended to be stored, or even during imaging to be stored, if the image is of, for example, a video imaging application.

In cameras, focusing conventionally involves the collection of statistics from an image data. According to one embodiment, the statistics can include, for example, a search for gradients for the detection of an edge of a primary image object. The statistics can be formed of, for example, luminance information of the image data. The focusing operations also include the movement of the lenses 15, in order to maximize the statistical image sharpness mathematically by comparing statistical information. Focusing can be performed automatically or also by the end user, who can manually adjust the focus, if there is, for example, a manually adjustable focus disc (mechanical focus control) in the camera.

If the focusing is implemented automatically in the device 10, the focusing circuit 28 shown in FIG. 1 can include an autofocus control algorithm 24 stored on a computer readable memory, in which there can be a focus-point definition portion 21 as a sub-module. Further, there can be included within or in addition to the focusing circuit 28, a circuit for defining and assigning focus value masks for sub-windows of interest in accordance with the exemplary embodiments of the invention. In addition, the focusing circuit 28 or another circuit is capable of inserting an additional sub-WOI in an overlapping manner within a WOI. As input, the algorithm portion 24 receives AF data from the calculating module 20 of AF statistics. A modular such as, but not limited to, the statistics module 20 can process the image data in ways that are in accordance with the exemplary embodiments of the invention, and form from it, for example, the aforementioned gradient data. Further, the image data may be fed directly to the AD converter 13. On the basis of the data produced by the statistics module 20, the algorithm portion 24 can decide whether it images a selected first image object sharply to the sensor 12 in a manner in accordance with the exemplary embodiments of the invention. As output, the algorithm portion 24 produces control data that is as such known, for the adjustment mechanism 14 of the set of lenses 15. The control data is used to move the set of lenses 15, in such a way that the one or more image objects defined as primary by the focus-point sub-module 21 is imaged precisely and sharply to the sensor 12.

The image-processing chain 27 connected to the camera circuit 11, 14 can include various modules in different implementation arrangements, which are used, for example, for processing, in the device 10, the image data formed from the imaging target. In both cases, whether imaging to be stored is being performed at that moment by the device 10 or not, it is possible to perform so-called viewfinder imaging, for which there can be a dedicated viewfinder module VF 23 in the device 10. The viewfinder VF 23 can be after color-interpolation 16, and or also after the enhancement algorithms sub-module 17. It is noted that the enhancement algorithms sub-module may comprise various other sub-modules which may perform different functions.

An image-processing chain IC can consist of one or more processing circuits which may include, but is not limited to, modules or sub-modules 16, 17, and 18. In this case, the color-interpolation 16, the enhancement algorithm sub-module 17, and image-data compression 18 of the image-processing chain 27 are shown. When the image data is stored, this can take place to some storage medium 19. The technical implementation of these components will be obvious to one versed in the art and for this reason the invention is described at the illustrated block-diagram level. In terms of the practical implementation of the invention, hardware and software solutions, as well as combinations of them, can be considered. Of course, the circuits described in regards to FIG. 1 are not limiting for practicing the exemplary embodiments of the invention. The functional modules of or processes of a device according to the exemplary embodiments of the invention may contain more or less functional modules, sub-modules, and/or processes than described in FIG. 1.

The focusing-area calculation module 22 can use the data obtained from the AF-statistics calculation portion 20 in the definition of the image area and now also the data obtained from the focusing point definition portion 21. Once the portion 22 has been calculated the focused primary image object of the image data, its location in the image information formed by the image data, and also its shape can be determined in the location areas of the one or more primary image objects in the image.

The data obtained from the calculation portion 22 of the focused area may be sent to a module or sub-module of the image-processing chain 27. On the basis of the data of the focused focus area (e.g the focus area may be a portrait area), the final area, which is used in the calculation of the filtering coefficients, can be selected/calculated. This area can even be pixel-accurate, thus delimiting the primary image object very precisely. In addition, some or all of the modules, sub-modules, and/or processes can be implemented in a single module or in different modules or sub-modules. Further, the directions indicated by the arrows between the modules may or may not be determining of the operations in accordance with the exemplary embodiments of the invention and the names or labels indicated for the modules or sub-modules are not limiting, so that some or all of these modules may be named or labeled differently.

In an automatic focusing/image-object selection application, focusing can be concentrated on, for example, one or more image areas or WOI (for example, on the centre of the imaging object). These focusing points can also be intelligently selected from the entire image area.

It can be understood that a properly designed rule-based AF algorithm must be able to select a correct focus window or WOI even if there are multiple objects in a scene. The robustness and flexibility of automatic focusing primarily results from the proper choice of the number and position of the WOIs.

The exemplary embodiments of the invention relate to novel adaptive configuration scheme for WOIs in multispot AF. The exemplary embodiments of the invention provide at least a method, executable computer program, and apparatus for reducing the effects in a multispot AF of camera shaking and "zooming". In addition, certain exemplary embodiments of the invention employ a configuration scheme which adds robustness to a focusing algorithm, particularly when focusing on small objects of a size comparable to a size of one WOI of multiple WOIs of an image. It is noted that in accordance with the exemplary embodiments of the invention each of the multiple WOIs in a multispot AF may be herein referred to as a sub-WOI.

As similarly stated above, three most crucial factors affecting the performance of an automatic focusing algorithm are: 1) the light level, 2) the contrast of the subject of interest, and 3) motion of the camera or subject during the focusing. Below are disclosed further details of problems affecting these factors as addressed by the exemplary embodiments of the invention.

Problem 1

Many camera phones are equipped with the three-stage capture buttons. These stages include a 1st stage where a button is not pressed, a 2nd stage where the button is half pressed, and a 3rd stage where the button is fully pressed. Due to the small size of many such camera phones and the possible need to half press the button in order to focus, the camera can typically shake during a focusing operation. In addition, at low-light situations, such as indoors, when the exposure time needs to be quite long, any camera motion, such as the above described shaking, can affect focus value curves. In this case, some consecutive scene frames, which are captured at different lens positions, may become blurred. In addition, due to such camera motion, the frames of an image may also become shifted with respect to each other, and as a result these frames may each contain slightly different image content. An additional effect, which is very similar to camera shaking, is the so-called "zooming" effect. For example, when the lens moves between a far mechanical end and a near mechanical end, such as during a focusing operation, a small zooming of the image window occurs. As a result the area in each sub-WOI will be slightly different depending upon the lens position.

All these aforementioned effects can result in abrupt changes in image contrast (or alternatively focus values) for a particular WOI. Such changes can occur if, for example, a contrasting element (e.g. edge) appears or vice versa disappears from a WOI as a result of motion and/or zooming. Exemplary embodiments of the invention address at least these problems by reducing the effect of these issues, as stated above, in order to at least smooth focus value curves during a focusing.

Problem 2

The automatic focusing algorithms often experience problems when focusing on small objects of an image. As an example these small objects may be of a size approximately equal to the size of one sub-WOI. However, the position of the small object rarely coincides with the position of a particular sub-WOI in an image plane. More frequently small objects may occupy part of one sub-WOI and part of another. In addition, when there are multiple objects at different depths in one WOI, or over several sub-WOIs, the focus curves may become flat with not very well-defined peaks. This is a possible source of errors that can often lead to false peak detections and out-of-focus images.

Another aspect of the exemplary embodiments of the invention address at least these problems, described in PROBLEM 2, by increasing the sensitivity of AF to focus on small objects of interest especially in the presence of a high contrast background.

Figure 2:
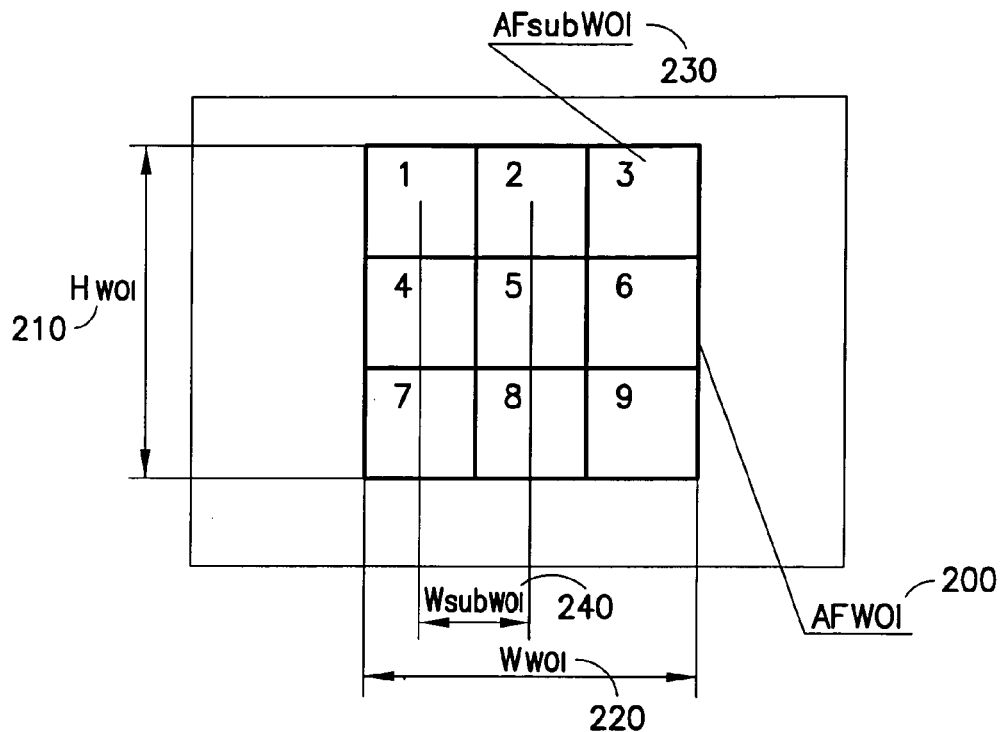
FIG. 2 illustrates a Window of interest in many current implementations of multispot AF.

FIG. 2 relates to an implementation of multispot AF WOI 100 where there is a grid consisting of N rows and M columns (N×M) of sub-WOIs. In FIG. 2 there is illustrated a configuration of 9 blocks with 3 rows (N) and 3 columns (M). The N and M are identified as $H_{WOI}$ (210) and $W_{WOI}$ (220), respectively. The width of each AF sub-WOI (230) is denoted by a value $W_{subWOI}$ (240) (the same as the distance between the centers of two neighboring sub-WOIs). The real-time computation of image sharpness in this implementation may be performed in an H3A engine of an image signal processor (ISP). In this configuration a problem arises as the configuration of the N×M sub-WOIs for the multispot AF is not very tolerant of camera handshaking and also can exhibit poor performance under low-light conditions especially if a size of an AF sub-WOI (230) is relatively small. In addition, another problem which can be seen to occur here is that small objects of interest of an image can easily appear between two AF sub-WOIs (230). This would result in a focus value curve with poorly defined peaks.

A perceived solution for either PROBLEM 1 or PROBLEM 2 can be seen to worsen the other problem. On one side, by increasing the sub-WOI size one can improve the image statistics in low-light and reduce the effect of handshaking. On the other side, this has two major undesired effects. First, the bigger sub-WOIs decrease the capability of an AF algorithm to focus on small objects, as the probability that there will be several objects in one sub-WOI increases as the sub-WOI size gets bigger. Second, the increase of focus window size increases the AF integration time needed for computation of AF statistics and, as a result, increases the latency of AF.

The exemplary embodiments of the invention relate to a novel adaptive configuration of sub-WOIs for use in an AF procedure, such as a multispot AF, which address the above issues. The exemplary embodiments of the invention provide for enhancing image statistics at low-light conditions and at the presence of camera motion. In addition the exemplary embodiments of the invention also provide improved discrimination of objects of a small size by an AF.

In accordance with the exemplary embodiments of the invention sub-WOIs are configured to overlap partially with different weights while the overall size of an AF WOI does not increase. The resulting focus value is a weighted calculation of several (e.g. three) different masks assigned to each part of logically separated sub-WOIs such that it reduces false focusing information which may be based on occurrences such as motion. In accordance with another aspect of the exemplary embodiments of the invention there is an increase of sub-WOIs in a middle row of an AF grid such as to 2*M−1 in order to improve an auto focus detection of an object of interest so it can be tracked more precisely.

Figure 3:
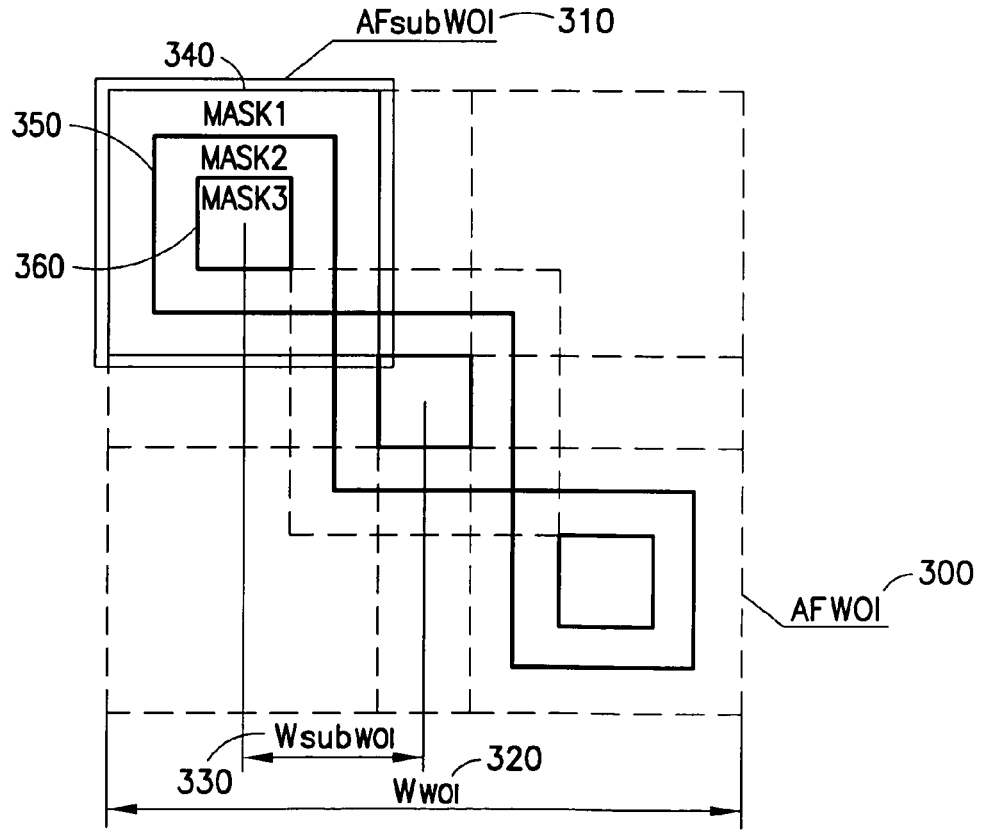
FIG. 3 illustrates a Window of interest in the proposed implementation of multispot AF with overlapping sub-WOIs.

With regards to issues similar to PROBLEM 1 as stated above, as illustrated in FIG. 3 in accordance with the exemplary embodiments of the invention there is, for use in an AF, a configuration of partially overlapping sub-WOIs with different assigned weights. An example of an overlapping AF sub-WOI 310 is depicted in FIG. 3 by the square line surrounding an AF sub-window of interest (310) which has been logically separated into a plurality of parts which include a Mask 1 (340), Mask 2 (350) and Mask 3 (360). Due to this overlapping of the AF sub-WOIs (310), it is possible to increase the width/height of each AF sub-WOI 310 without increasing the overall size of AF WOI (300) as depicted with $W_{WOI}$ (320). From FIG. 3 one can see that while the distance between the centers of two neighboring sub-WOIs stays $W_{subWOI}$ (330), which is the same as for the non-overlapping scheme, the effective width of each AF sub-WOI (310) increases.

Furthermore, in accordance with the illustration of FIG. 3, we propose to compute the resulting focus value in overlapping sub-WOIs is computed as a weighted calculation such as a sum of focus values from the three different masks. In a non-limiting embodiment of the invention the weight for the inner Mask 3 (360) is maximal and is represented by $Value_3$, the weight for the Mask 2 (350) is represented by $Value_2$, and the weight for the outer Mask 1 (340) is represented by $Value_1$. According to the exemplary embodiments of the invention the focus value for a sub-WOI such as the sub-WOI 310 may then be calculated as:

$$FV_{sub\text{-}WOI\ 1} = Value_1 * FV_{Mask1} + Value_2 * FV_{Mask2} + Value_3 * FV_{Mask3}.$$

Where $Value_x$ represents a value such as a rational number or decimal value assigned to a corresponding focus value mask. The weighting of focus values are seen to reduce the effects of camera motion and zooming. For example, if some contrasting element (e.g. edge) located at the border of a particular sub-WOI suddenly disappears from that sub-WOI due to zooming or camera motion, the overall impact of this occurrence will be attenuated or lessened, as the sharpness values in Mask 1 have a smaller weight and thus provides a smaller contribution to the resulting focus value.

As an example of the above disclosed exemplary embodiments of the invention, for a case where the weight for the inner Mask 3 is maximal and is equal to 1, the weight for the Mask 2 equals 0.75, and the weight for the outer Mask 1 equals to 0.625. Then the focus value for a sub-WOI such as the sub-WOI 310 may then be calculated as:

$$FV_{sub\text{-}WOI\ 1} = 0.625 * FV_{Mask1} + 0.75 * FV_{Mask2} + 1 * FV_{Mask3}.$$

Figure 4:
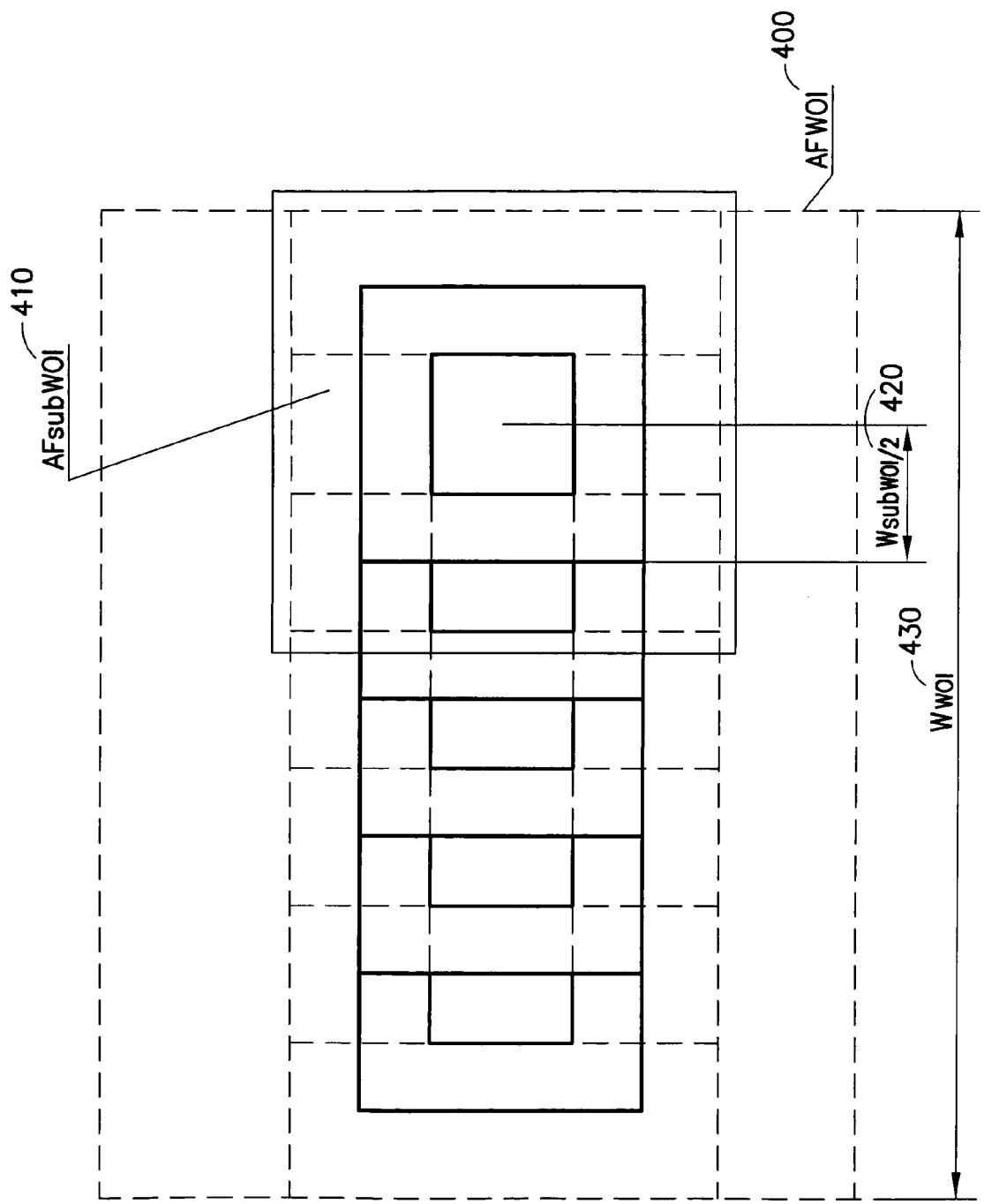
FIG. 4 illustrates a Window of interest in multispot AF with moving sub-WOIs in the middle row.

FIG. 4 illustrates an exemplary embodiment of the invention in order to improve the AF multispot configuration scheme by placing at least one additional AF sub-WOI (410) in the middle row of a grid of an AF WOI (400). The idea is to preserve the width of each sub-WOI, while decreasing the distance between the centers of two neighboring sub-WOIs. By changing the distance (420) from $W_{subWOI}$ to $W_{subWOI}/2$ we can increase the number of sub-WOIs in the middle row to 2*M−1, where M refers to the initial number of sub-WOI columns in the non-overlapping configuration of multispot AF (see FIG. 2). Using this method related to moving sub-WOIs, the position of an object of interest in an AF WOI (400) can be tracked more precisely. Thus, we can be more confident that at least in one sub-WOI there will be a distinct peak corresponding to the object of interest. Although, in accordance with the non-limiting exemplary embodiments of the invention, the sub-WOIs were added only to a middle row and so the number of sub-WOIs in an upper and lower row of the AF WOI was kept unchanged, it is noted that this configuration is non-limiting and the exemplary embodiments of the invention may be applied to any row including the upper and lower rows.

The configuration scheme, in accordance with the exemplary embodiments of the invention, was implemented for the multispot AF algorithm. This algorithm was a part of the library of imaging algorithms (ISP-NIPS) developed for ISP used in Nokia mobile phones. For this case, where the grid consisted of 12 sub-WOIs with M=4 columns and N=3 rows, the second (middle) row was further extended to 7 sub-WOIs yielding the total number of sub-WOIs to 15.

The AF statistics was computed with the H3A block of a camera ISP. The H3A engine allowed a setting up of a grid of small windows SWs in each sub-WOI or WOI, and for each SW the AF values are then separately accumulated for green, blue, and red colors. It is noted that the term "small windows" is non-limiting and refers to the minimal two-dimensional block of the image for which the focus value statistics can be calculated. Each sub-WOI can comprise multiple SWs. The calculating can be performed by, but not limited to, an operation of an H3A hardware engine. In accordance with the exemplary embodiments the total focus value will be the sum of focus values from all the SWs. It is noted that the sum may be calculated from overlapping and/or non-overlapping sub-WOI of the WOI. In addition, in accordance with the exemplary embodiments of the invention the term small windows may also be referred to as "paxels", or any other minimal unit available on a device, such as a CCD, used in an autofocus procedure in accordance with the exemplary embodiments of the invention.

For AF WOI configuration, the width of AF WOI $W_{WOI}$ was set up to 18 SWs and the height $H_{WOI}$ to 14 SWs. The distance between the two sub-WOIs $W_{subWOI}$ in the upper and lower rows was equal to 4 SWs, while the distance between the two neighboring sub-WOIs in the middle row were equal to 2 SWs. The overall size of each sub-WOI was equal to 6×6 SWs. That is the size of Mask 3 was 2×2 SWs, the size of Mask 2 was 3×3 SWs, and the size of Mask 1 was 6×6 SWs.

For each lens position the focus values were accumulated using the H3A block for each color and for each SW. Further, the focus values for each sub-WOI were summed from the corresponding SWs through the application of appropriate weights.

The exemplary embodiments of the invention have been proven to provide the following technical effects in multispot AF:
Enhancement of image statistics at low-light conditions through the use of bigger sub-WOIs
Preservation of total AF WOI size. Hence, no increase in AF integration time and AF latencies.
The improvement in robustness of focus values under conditions which include camera motion and/or image zooming.
Improved detectability of small objects comparable to the size of one sub-WOI.

Further, it is noted that the exemplary embodiments of the invention may result in:
A minor increase in memory usage due to an additional memory allocation for the masks and additional sub-WOIs; and
A minor increase in the complexity of the algorithm, mainly due to the more complex loop for computation of focus values from individual SWs.
Based on at least the preceding, it can be seen that the drawbacks are minimal and insignificant compared to the utility of the invention.

The embodiments of this invention may be implemented by computer software executable by a data processor of the, device 10, such as the main processor on board the device, or by hardware circuitry, or by a combination of software and hardware circuitry. Further in this regard it should be noted that the various blocks of the diagram of FIG. 1 may represent program steps, or interconnected logic circuits, blocks and functions, or a combination of program steps and logic circuits, blocks and functions for performing the specified tasks.

In general, the various embodiments of the electronic device 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by a data processor of the device 10, such as aforesaid modules or circuits 14, 11, 27, and 28, or by hardware, or by a combination of software and hardware. Further in this regard it should be noted that the various blocks of the diagram of FIGS. 1-4 may represent program steps, or interconnected logic circuits, blocks and functions, or a combination of program steps and logic circuits, blocks and functions. It is noted that any of these devices may have multiple processors (e.g. RF, baseband, imaging, user interface) which operate in a slave relation to a master processor. The teachings may be implemented in any single one or combination of those multiple processors.

The memories such as storage memory 19 may be of any type suitable to the local technical environment and may be implemented using any suitable data storage technology, such as semiconductor-based memory devices, magnetic memory devices and systems, optical memory devices and systems, fixed memory and removable memory. The aforesaid modules or circuits 14, 11, 27, and 28 may be of any type suitable to the local technical environment, and may include one or more of general purpose computers, special purpose computers, microprocessors, digital signal processors (DSPs)/image signal processors ISP and processors based on a multi-core processor architecture, as non-limiting examples.

In accordance with the exemplary embodiments of the invention there is at least a method, executable computer program, and apparatus for logically separating into a plurality of parts at least one sub-window of interest of a plurality of sub-windows of interest arranged in a grid formation in an autofocus window of interest, and assigning a focus value mask to each of the plurality of parts of the at least one sub-window. Further, in accordance with the above there can be an increasing of at least one of a width or height of the at least one sub-window of interest so that it partially overlaps with at least one adjacent sub-window of interest in the grid formation, where a distance between a center of the at least one sub-window of interest and the at least one adjacent sub-window of interest in the grid remains unchanged. In another non-limiting exemplary embodiment of the invention there can be a placing of at least one additional sub-window of interest in at least one row of sub-windows of interest in the grid formation, such that a width of a sub-window of interest in the at least one row of sub-windows remains unchanged, and the sub-window of interest in the at least one row overlaps with at least one adjacent sub-window such that a distance between a center of the sub-window of interest and the adjacent sub-window of interest in the grid formation decreases.

In accordance with any of the above, there can be a placing of the at least one additional sub-window of interest in the at least one row that comprises changing the distance between the center of the sub-windows of interest in the at least one row from $W_{subWOI}$ to $W_{subWOI}/2$ in order to increase the number of sub-windows in the at least one row to $2*M-1$, where M refers to the initial number of sub-window columns in a non-overlapping configuration of the grid formation. In addition, according to any of the above there can be a computing of a focus value of an object of interest based on at least one corresponding focus value mask, and determining an autofocus setting for the object of interest based on at least the computed focus value. Where the computing of the autofocus value (FV) according to any of the above can use calculations including:

$$FV_{subWOI\,1} = Value_1 * FV_{Mask1} + Value_2 * FV_{Mask2} + Value_3 * FV_{Mask3} \text{ where } Value_x$$

represents a rational value (which may be a decimal) value assigned to a corresponding focus value mask.

Further, in any of the above a focus value mask of a logically separated part of a sub-window that is closer to a center of the sub-window is assigned a higher weighted focus value than a focus value mask of a logically separated part of the sub-window that is farther from the center of the sub-window. Where, in the above, for a case where the plurality of parts of the at least one sub-window of interest comprise a first part closest to the center of the sub-window of interest, a third part farthest from the center of the sub-window of interest, and a second part in between the first part and the second part, where the first part has a weighted focus value of $Value_3$, the second part has a weighted focus value of $Value_2$, and the third part has a weighted focus value of $Value_1$. In addition, where in any of the preceding can be performed or embodied in a user equipment.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:

logically separating into a plurality of parts at least one sub-window of interest of a plurality of sub-windows of interest arranged in a grid formation in an autofocus window of interest;

assigning a focus value mask to each of the plurality of parts of the at least one sub-window; and executing an autofocus algorithm using the assigned focus value masks, where the plurality of parts of the at least one sub-window of interest comprise a first part closest to a center of the at least one sub-window of interest, a third part farthest from the center of the at least one sub-window of interest, and a second part in between the first part and the second part, where the first part has a weighted focus value of $Value_1$, the second part has a weighted focus value of $Value_2$, and the third part has a weighted focus value of Value$_3$, where Value$_1$, Value$_2$, and Value$_3$ each represent a rational value assigned to a corresponding focus value.

2. The method according to claim 1, wherein each of the at least one sub-window of interest along at least one row or column of the grid formation partially overlaps an adjacent one of the plurality of sub-window of interest in the grid formation, and where a distance between a center of the at least one sub-window of interest and the adjacent sub-window of interest in the grid formation remains unchanged.

3. The method according to claim 2, further comprising computing a focus value of an object of interest based on at least one corresponding focus value mask; and determining an autofocus setting for the object of interest based on at least the computed focus value.

4. The method according to claim 3, where computing the autofocus value (FV) uses calculations comprising:

$$FV_{subWOI1} = \text{Value}_1 * FV_{Mask1} + \text{Value}_2 * FV_{Mask2} + \text{Value}_3 * FV_{Mask3}$$

where Value$_1$, Value$_2$, and Value$_3$ each represent a rational value assigned to a corresponding focus value mask.

5. The method according to claim 1, where an additional at least one sub-window of interest is placed in at least one row of sub-windows of interest in the grid formation such that a number of sub-windows of interest in the at least one row is greater than in another row of the grid formation, and where a width of a sub-window of interest in the at least one row of sub-windows remains unchanged, and the sub-window of interest in the at least one row overlaps with at least one adjacent sub-window such that a distance between a center of the sub-window of interest and the adjacent sub-window of interest in the grid formation decreases.

6. The method according to claim 5, where the placing the at least one additional sub-window of interest in the at least one row, comprises:
changing the distance between the center of the sub-windows of interest in the at least one row from $W_{subWOI}$ to $W_{subWOI}/2$ in order to increase the number of sub-windows in the at least one row to 2*M−1, where M refers to the initial number of sub-window columns in a non-overlapping configuration of the grid formation.

7. The method according to claim 1, where a focus value mask of a logically separated part of a sub-window that is closer to a center of the sub-window is assigned a higher weighted focus value than a focus value mask of a logically separated part of the sub-window that is farther from the center of the sub-window.

8. The method according to claim 1, performed in a user equipment.

9. A non-transitory computer readable medium encoded with a computer program executable by a processor to perform actions comprising:
logically separating into a plurality of parts at least one sub-window of interest of a plurality of sub-windows of interest arranged in a grid formation of an autofocus window of interest;
assigning a focus value mask to each of the plurality of parts of the at least one sub-window; and
executing an autofocus algorithm using the assigned focus value masks, where the plurality of parts of the at least one sub-window of interest comprise a first part closest to a center of the at least one sub-window of interest, a third part farthest from the center of the at least one sub-window of interest, and a second part in between the first part and the second part, where the first part has a weighted focus value of Value$_1$, the second part has a weighted focus value of Value$_2$, and the third part has a weighted focus value of Value$_3$, where Value$_1$, Value$_2$, and Value$_3$ each represent a rational value assigned to a corresponding focus value.

10. The non-transitory computer readable medium encoded with a computer program according to claim 9, wherein each of the at least one sub-window of interest along at least one row or column of the grid formation partially overlaps an adjacent one of the plurality of sub-window of interest in the grid formation, and where a distance between a center of the at least one sub-window of interest and the adjacent sub-window of interest in the grid formation remains unchanged.

11. The non-transitory computer readable medium encoded with a computer program according to claim 10, further comprising
computing a focus value of an object of interest based on at least one corresponding focus value mask; and
determining an autofocus setting for the object of interest based on at least the computed focus value.

12. The non-transitory computer readable medium encoded with a computer program according to claim 11, where computing the autofocus value (FV) uses calculations comprising:

$$FV_{subWOI1} = \text{Value}_1 * FV_{Mask1} + \text{Value}_2 * FV_{Mask2} + \text{Value}_3 * FV_{Mask3}$$

where Value$_1$, Value$_2$, and Value$_3$ each represent a rational value assigned to a corresponding focus value mask.

13. The non-transitory computer readable medium encoded with a computer program according to claim 10, where a focus value mask of a logically separated part of a sub-window that is closer to a center of the sub-window is assigned a higher weighted focus value than a focus value mask of a logically separated part of the sub-window that is farther from the center of the sub-window.

14. The non-transitory computer readable medium encoded with a computer program according to claim 9, where an additional at least one sub-window of interest is placed in at least one row of sub-windows of interest in the grid formation such that a number of sub-windows of interest in the at least one row is greater than in another row of the grid formation, where
a width of a sub-window of interest in the at least one row of sub-windows remains unchanged, and
the sub-window of interest in the at least one row overlaps with at least one adjacent sub-window such that a distance between a center of the sub-window of interest and the adjacent sub-window of interest in the grid formation decreases.

15. The non-transitory computer readable medium encoded with a computer program according to claim 14, where the placing the at least one additional sub-window of interest in the at least one of a row of the grid formation, comprises:
changing the distance between the center of the sub-windows of interest in the at least one row from $W_{subWOI}$ to $W_{subWOI}/2$ in order to increase the number of sub-windows in the at least one row to 2*M−1, where M refers to the initial number of sub-window columns in a non-overlapping configuration of the grid formation.

16. An apparatus comprising:
a processor configured to logically separating into a plurality of parts at least one sub-window of interest of a plurality of sub-windows of interest arranged in a grid formation of an autofocus window of interest;

the processor configured to assign a focus value mask to each of the plurality of parts of the at least one sub-window; and the processor further configured to execute an autofocus algorithm using the assigned focus value mask, where the plurality of parts of the at least one sub-window of interest comprise a first part closest to a center of the at least one sub-window of interest, a third part farthest from the center of the at least one sub-window of interest, and a second part in between the first part and the second part, where the first part has a weighted focus value of $Value_1$, the second part has a weighted focus value of $Value_2$, and the third part has a weighted focus value of $Value_3$, where $Value_1$, $Value_2$, and $Value_3$ each represent a rational value assigned to a corresponding focus value.

17. The apparatus according to claim 16, wherein each of the at least one sub-window of interest along at least one row or column of the grid formation partially overlaps with an adjacent one of the plurality of sub-window of interest in the grid formation, and where a distance between a center of the at least one sub-window of interest and the adjacent sub-window of interest in the grid formation remains unchanged.

18. The apparatus according to claim 17, further comprising
an executable computer program and a processor configured to compute a focus value of an object of interest based on at least one corresponding focus value mask; and the processor and a display interface configured to determine an autofocus setting for the object of interest based on at least the computed focus value.

19. The apparatus according to claim 18, where computing the autofocus value (FV) uses calculations comprising:

$$FV_{subWOI1} = Value_1 * FV_{Mask1} + Value_2 * FV_{Mask2} + Value_3 * FV_{Mask3}$$

where $Value_1$, $Value_2$, and $Value_3$ each represent a rational value assigned to a corresponding focus value mask.

20. The apparatus according to claim 16, where an additional at least one sub-window of interest is placed in at least one row of sub-windows of interest in the grid formation such that a number of sub-windows of interest in the at least one row is greater than in another row of the grid formation, where
a width of a sub-window of interest in the at least one row of sub-windows remains unchanged, and
the sub-window of interest in the at least one row overlaps with at least one adjacent sub-window such that a distance between a center of the sub-window of interest and the adjacent sub-window of interest in the grid formation decreases.

21. The apparatus according to claim 20, where the placing the at least one additional sub-window of interest in the at least one of a row of the grid formation, comprises:

the processor configured to change the distance between the center of the sub-windows of interest in the at least one row from $W_{subWOI}$ to $W_{subWOI}/2$ in order to increase the number of sub-windows in the at least one row to $2*M-1$, where M refers to the initial number of sub-window columns in a non-overlapping configuration of the grid formation.

22. The apparatus according to claim 16, where a focus value mask of a logically separated part of a sub-window that is closer to a center of the sub-window is assigned a higher weighted focus value than a focus value mask of a logically separated part of the sub-window that is farther from the center of the sub-window.

23. The apparatus according to claim 16, embodied in a user equipment.

24. An apparatus, comprising:
means for logically separating into a plurality of parts at least one sub-window of interest of a plurality of sub-windows of interest arranged in a grid formation in an autofocus window of interest;

means for assigning a focus value mask to each of the plurality of parts of the at least one sub-window; and means for executing an autofocus algorithm using the assigned focus value masks, where the plurality of parts of the at least one sub-window of interest comprise a first part closest to a center of the at least one sub-window of interest, a third part farthest from the center of the at least one sub-window of interest, and a second part in between the first part and the second part, where the first part has a weighted focus value of $Value_1$, the second part has a weighted focus value of $Value_2$, and the third part has a weighted focus value of $Value_3$, where $Value_1$, $Value_2$, and $Value_3$ each represent a rational value assigned to a corresponding focus value.

25. The apparatus according to claim 24, wherein each of the at least one sub-window of interest along at least one row or column of the grid formation partially overlaps an adjacent one of the plurality of sub-window of interest in the grid formation, and where a distance between a center of the at least one sub-window of interest and the adjacent sub-window of interest in the grid formation remains unchanged.

26. The apparatus according to claim 24, where an additional at least one sub-window of interest is placed in at least one row of sub-windows of interest in the grid formation such that a number of sub-windows of interest in the at least one row is greater than in another row of the grid formation, where a width of a sub-window of interest in the at least one row of sub-windows remains unchanged, and the sub-window of interest in the at least one row overlaps with at least one adjacent sub-window such that a distance between a center of the sub-window of interest and the adjacent sub-window of interest in the grid formation decreases.

* * * * *